UNITED STATES PATENT OFFICE.

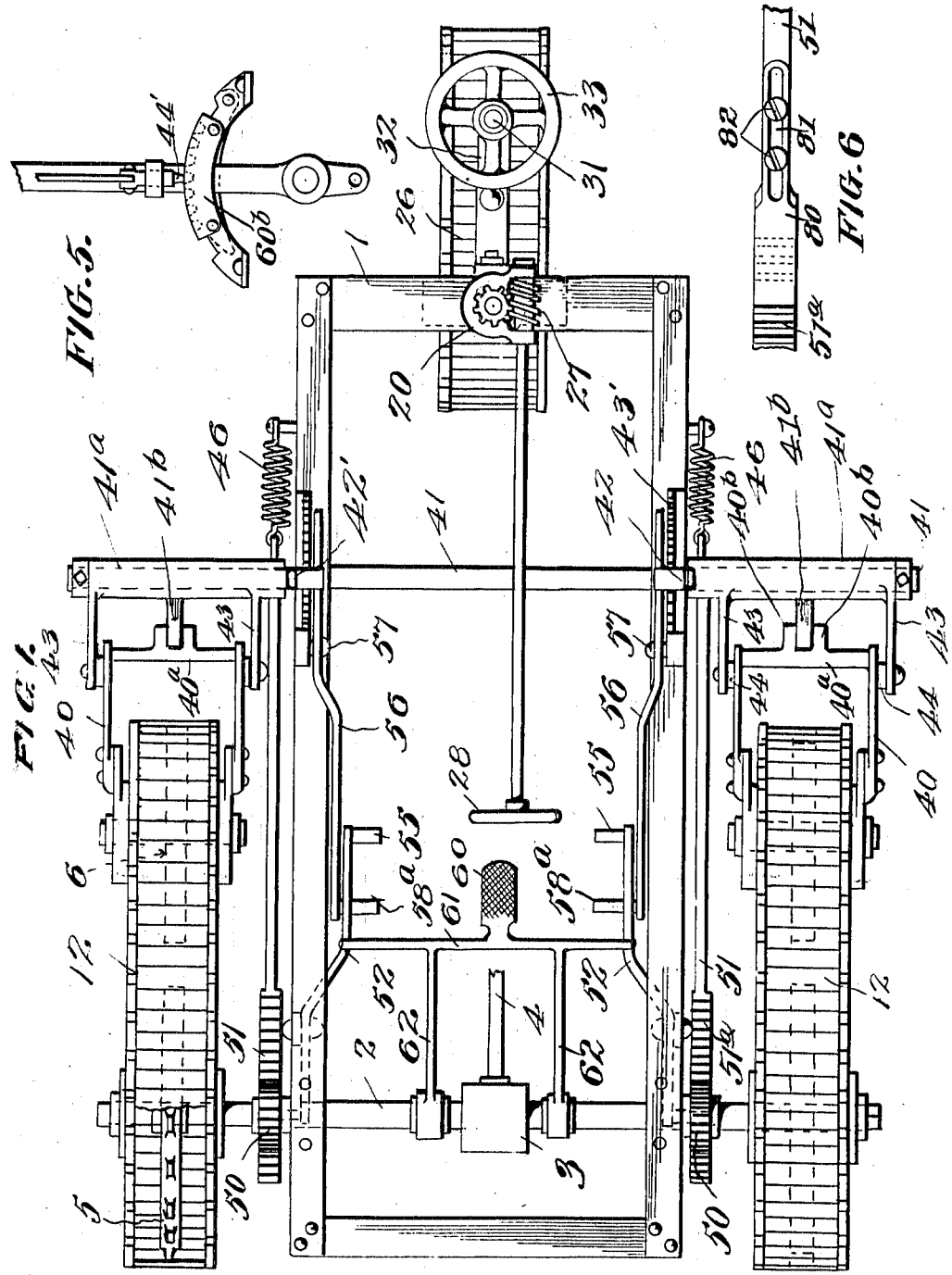

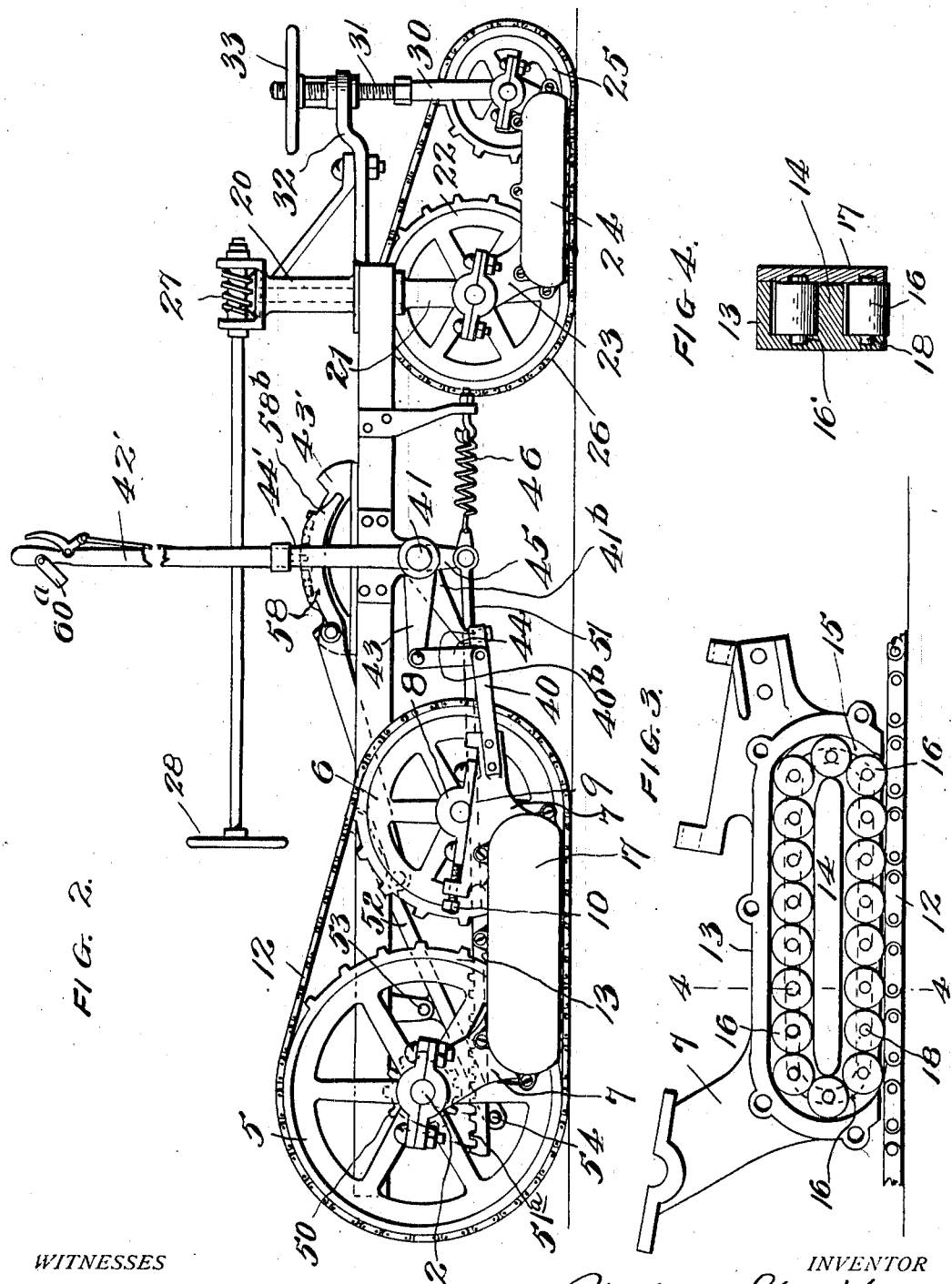

WILLIAM STRAIT OF EAU CLAIRE, WISCONSIN.

TRACTOR.

1,105,862.   Specification of Letters Patent.   Patented Aug. 4, 1914.

Application filed October 3, 1911. Serial No. 652,599.

*To all whom it may concern:*

Be it known that I, WILLIAM STRAIT, a citizen of the United States, and a resident of Eau Claire, Wisconsin, have invented a certain new and useful Tractor, of which the following is a specification.

My invention relates to a motor driven tractor designed especially for agricultural purposes, although its range of use is not limited. It is intended for hauling wagons, drawing plows and other agricultural implements, etc.

Among the principal features of my invention is the provision of traction surfaces of sufficient area to prevent the vehicle from sinking into soft ground such as plowed land. In a preferred form, these traction surfaces are belts, each passing over two wheels.

The invention also includes means for raising one of the wheels of each pair so that the vehicle may be turned without difficulty.

I will now describe my invention in detail with reference to the accompanying drawing which illustrates an exemplifying embodiment of the invention.

Figure 1 is a plan view; Fig. 2 is a side elevation; Fig. 3 is a fragmentary enlarged view of the roller support for one of the belts with the cover plate removed; and Fig. 4 is a transverse section of the roller support. Fig. 5 is a detailed view showing the detachable plate secured to the sector. Fig. 6 is a detail of the adjustable throw-off block applied to the elevating rack.

Reference character 1 designates the frame carrying near its rear end the rear axle 2. This may be a live rear axle and provided with a differential mechanism 3. Drive shaft 4 may connect the differential with any suitable motor mounted on the frame (not shown).

At each side of the machine, near the rear, is a tractor belt and necessary appurtenances. These are duplicates and only one need be described. The tractor mechanism comprises a driven sprocket 5 impelled by the axle and an idler sprocket 6. The idler is mounted on a short shaft spaced away from the drive shaft by radius pieces 7 which are also utilized to provide the housing for the roller support of the belt. The shaft of idler 6 is mounted in journal boxes 8 which are adjusted on seats 9 of the radius pieces by means of screws 10 or other suitable device. The tractor belt 12 passes around the drive sprocket and idler and is of suitable width and may be of greatly varying construction, a preferred form as shown consisting of strips or slats extending all the way across the belt and provided near the center with suitable teeth to be engaged by the sprockets. To insure sufficient traction and keep the belt in proper contact with the ground between the sprockets, roller supports are provided, of which the housings 13, as above stated, are carried by radius members 7. Within the housing is the relatively long track 14 and between this track and the housing is a space or channel 15 in which the rollers 16 circulate. The lower portion of the housing is open and the rollers as they pass rearwardly into this open portion of the housing come between the track 14 and the belt so that as the belt moves rearwardly it is carried by the rolling members practically without friction and uniformly in contact with the ground. The rollers are prevented from displacement when the belt is slackened for any reason by means of grooves 16 in the housing and its cover 17 and studs or trunnions 18 on the ends of the rollers engaging these grooves.

The roller support in the arrangement shown provides practically a continuous support for the belt from the bottom point of the idler to the bottom point of the drive sprocket and this is possible because the sprockets are made relatively narrow so that the roller housing may extend from tread to tread of the sprockets as described.

At the front end the frame is provided with a steering head 20 in which is mounted a steering fork 21 carrying the main front sprocket 22. This sprocket is provided with radius members 23 and roller belt support 24 similar to the devices already described with reference to the rear traction belts. The radius members 23 support a front idler sprocket 25 and a belt 26 similar to the ones already described runs around sprockets 22, 25. A worm and gear steering mechanism 27, comprising a shaft and hand wheel 28 convenient to the operator, are provided by which the front main sprocket 22 may be turned for steering.

Evidently the long tractor belts in contact with the ground will afford a considerable obstacle to turning the vehicle. To overcome this difficulty I have provided means for raising one end of each of the belts whenever necessary in turning, or for other reasons, as, for instance, when running on hard ground.

I will first describe the means for elevating the front idler sprocket 25 in connection with the principal steering function of the vehicle. The idler sprocket 25 is provided with a fork 30 having a screw threaded stem 31 passing through a strut 32 extending forward from and turning with the steering fork 21 of the main front sprocket 22. A hand wheel 33 engages the screw 31 and abuts against the upper face of the strut. When it is desired to turn the vehicle, in case conditions are such that it is necessary to raise the front end of belt 26, hand wheel 33 is revolved so that the idler is elevated and then the belt as a whole is turned in the steering direction by manipulating the steering wheel 28. At the same time the turning movement may be facilitated by raising either or both of the rear idlers, wherefor the following devices are provided: Each of the radius members 7 is provided with two arms 40. A shaft 41 extending across the frame carries on each end a sleeve $41^a$ and on each sleeve is mounted a hand lever $42'$. Each sleeve $41^a$ has two arms 43 extending rearwardly and connected with arms 40 by links 44. The arms 40 of the radius members are connected by a cross piece $40^a$ and at the front of this cross piece are two lugs $40^b$. Sleeve $41^a$ is provided with a rearward and downward extending arm $41^b$, which fits closely between lugs $40^b$. Adjacent to each lever $42'$ is a notched segment $43'$. The lever is provided with a hand operated pawl $44'$ (Figs. 2 and 6) to engage the notches of the segment. The lever sleeve $41^a$ also has a downward extending arm 45 and a spring 46 tensioned between this arm and a fixed point on the frame adds to the force of gravity in urging the idler sprockets downward to insure a sufficient traction. To elevate the idler sprockets then by hand, lever pawls $44'$ are raised and the levers pushed forward and again locked to support the idlers in an elevated position by releasing the pawl which engages a suitable notch in the segment. Similarly, to increase the tractive effect of the idlers, the lever may be pulled rearward and locked by means of the pawl. The arms $41^b$ carried by sleeves $41^a$ engaging between lugs $40^b$ give lateral support to the tractors at all times and prevent the front ends of the belt supports from moving sidewise, while at the same time the idler sprockets may freely move up and down as described. Power means are also supplied for raising the idlers. For this purpose the drive shaft adjacent to each wheel is provided with a gear 50. A link 51 connected to the short vertical arm 45 of each of the hand levers extends to the rear and adjacent to the gear 50 is provided with teeth $51^a$ forming a rack to engage the gear. To bring the rack into engagement with the gear there is a pedal lever 52 pivoted at 53 on the frame and provided with a pin or stud 54 underlying the rack. The lever also has a foot piece or pedal 55 convenient to the operator. There is also for each tractor belt a throw-off lever 56 pivoted at 57 and provided with an arc-shaped segment 58 underlying the end of pawl $44'$. The rear end of this throw-off lever has a pedal $58^a$ underlying the forward end of lever 52. The arc shaped segment 58 has a free end or toe cut away as at $58^b$ adjacent to the end notch of the segment $43'$.

To utilize the rotative effect of the drive sprockets 5 to elevate one of the rear idlers, the operator depresses pedal 55. This brings the rack $51^a$ into engagement with its gear 50 and at the same time the pedal lever 52 depresses pedal $58^a$ of lever 56 throwing up the segment 58 and releasing pawl $44'$ of lever $42'$ from the segment. Link 51 is now pulled to the rear by the rotation of gear 50. This elevates the arm 43 of the hand lever and consequently raises the front ends of the radius members 7 and the idler sprocket so that the belt engages the ground only under the tread of the rear sprocket and turning may be easily accomplished. The length of rack $51^a$ may be such that when the idler sprockets have been sufficiently elevated, the last tooth of the rack is just about free from the gear 50. The operator may also discontinue the elevation of the idlers at any time by releasing pedal 55 and thereupon the pawl $44'$ will also be released and hold the idler in elevated position. While the pedal 55 is still depressed by the operator, the pawl $44'$ of the hand lever is released by the throw-off segment 58. As it approaches the last forward notch of the segment, by reason of the pawl coming to the cut-away portion $58^b$ of the throw off member, the pawl thereupon drops into the last notch and retains the lever and corresponding idler in elevated position. But to release the pawl and cause the idler to drop again at any time, it is only necessary to further depress the pedal $58^a$ which raises the throw-off segment 58 still further and the free end or toe of the segment thereupon again raises the pawl $44'$ and releases it from the notch, whereupon the lever may move back to central position and the idler sprocket descend. If it is desired, a latch $60^a$ may be provided on the hand lever by which the pawl may be retained permanently out of action and in this case the vehicle may be controlled entirely by the pedals so that as soon as the pedal is released the idler sprockets will be permitted to drop again into contact with the ground and will there be held by gravity and the pull of spring 46.

The pawls 44' of the hand levers are kept out of engagement with the central notches of the ratchet segment by means of plates 60ᵇ, (Fig. 6) which are removably screwed or bolted to the segments. When these are in place, the pawls ride over the arc-shaped face of the plates but are free to engage the end notches in an obvious manner. When the plates are in position the levers and their pawls are usually controlled entirely by the foot pedals.

It is frequently desired, for the purpose of turning the vehicle, to elevate the idler sprocket 6 which is on the inside of the turn, while the idler sprocket on the outside of the turn is kept down. By this means the vehicle at the rear is caused to pivot about one of the drive sprockets 5, while the tractor belt on the opposite side of the machine (the outside of the curve) is kept fully in contact with the ground to give full tractive effort. By this means, together with proper manipulation of the steering belt, short turns on rough or soft ground are easily made. This maneuver is accomplished by proper manipulation of the pedals, the pedal 55 on the inside of the turn being depressed to raise the idler sprocket, while the pedal on the opposite side of the machine is let alone. But it is also frequently desirable to raise both of the rear idler sprockets so that the forward ends of the tractor belts are free from the ground at the same time. For this purpose a common pedal 60 is provided. This is carried on cross piece 61, the ends of which lie over pedal levers 52. Cross piece 61 is supported by bars or arms 62 which may conveniently be pivoted upon the rear axle or any other suitable part of the machine. Now by depressing the common pedal 60 the operator may cause both of the levers 52 to be depressed and both of the idler sprockets raised simultaneously by the power mechanism.

As shown in Fig. 6 the rack links 51 may in some cases be provided with stops or throw-off devices to limit the elevating action of the gears. These stops may consist of plates 80 provided with slots 81 and adjustably secured to the links by screws 82 passing through the slots. The stops 80 overlie a portion of the racks and when the racks are moved rearwardly by the gears, at the proper point the gear teeth engage the stops so that the rack is forced away from the teeth of the gear and the gear then rotates idly with relation to the rack without any further elevating effect and without injury to the gear teeth and rack It is to be understood that many variations in construction may be made within the spirit of my invention.

I claim:

1. In a tractor, an axle, tractor wheels mounted thereon, idler wheels, one in front of each tractor wheel, a tractor belt passing around each tractor wheel and its corresponding idler, driving mechanism, elevating means, and means for connecting and disconnecting said elevating means with the driving mechanism for elevating either idler wheel independently.

2. In a tractor, an axle, tractor wheels mounted thereon, idler wheels, one in front of each tractor wheel, a tractor belt passing around each tractor wheel and its corresponding idler, means for locking either idler in adjusted vertical position, driving mechanism, and means actuated by the driving mechanism for elevating either idler wheel independently.

3. In a tractor, a frame, a drive axle, a tractor belt mounted at each side of the frame and connected with the axle, driving mechanism, elevating means actuated by the driving mechanism for elevating one end of either tractor belt, locking means for securing the belt in adjusted position, and controlling means for simultaneously controlling the elevating and locking means.

4. In a tractor, the combination of a driving sprocket, an idler sprocket, a belt passing around the sprockets, a roller support for the belt between the sprockets, a gear turning with the drive sprocket, a link having a rack to engage the gear, means for engaging the rack with the gear, and connections between the link and the idler sprocket whereby the latter is elevated when the rack is engaged.

5. In a tractor, the combination of a frame, an axle, a drive sprocket thereon, an idler sprocket, radius members connecting the sprockets, a tractor belt passing around the sprockets, arms extending forward from the radius member, a lever connected to said arms to elevate the idler sprocket, a laterally rigid segment member supported by the frame, and lugs connected with said arms and embracing said segment member for laterally supporting the front ends of the belt mechanism 6. In a tractor, the combination of a main frame, an axle, tractor wheels, one on each side of the frame, an idler in front of each tractor wheel, a tractor frame connecting each idler with the axle, a tractor belt passing around each tractor wheel and its idler, and means carried by the main frame and engaging the tractor frames to prevent lateral motion of the free ends thereof.

7. In a tractor, the combination of a tractor belt, two sprockets therefor, a lever for elevating the front sprocket, a ratchet segment, a pawl carried by the lever to engage the segment, a throw-off member engaging the pawl and a pedal to actuate said member.

8. In a tractor, the combination of a tractor belt, two sprockets therefor, a lever for elevating the front sprocket, a ratchet segment, a pawl carried by the lever to engage the segment, a throw-off member engaging the pawl and having an arc-shaped portion substantially co-extensive with the central notches of the segment, and having a cutaway end portion adjacent to the end notch in the segment, and a pedal to actuate said member.

9. In a tractor, the combination of a tractor belt, a main pulley and an idler pulley therefor, a lever and connections to elevate the idler pulley, a lever pawl and a notched segment therefor, and a movable block and means for applying it to the segment to cover the central notches thereof.

10. The combination of a main frame, a tractor belt on each side thereof, driving means for the tractor belts, a frame for each tractor belt, bell-cranks, one pivoted on the main frame at each side thereof, a link connecting each bell-crank with the tractor frame, and means connecting each bell-crank with the driving mechanism whereby the driving mechanism may be caused to rotate the bell-cranks and lift the free ends of said tractor belts.

11. In tractor mechanism, the combination of a drive sprocket, an idler sprocket, a belt passing around the sprockets, and a roller support between the sprockets for holding the belt in engagement with the ground, said support comprising a casing having a channel therein, rollers circulating in the channel and engaging the belt, the rollers being provided with studs, the casing being provided with grooves in which the studs engage to prevent displacement of the rollers.

12. In tractor mechanism, the combination of the drive sprocket and idler sprocket, a belt passing around the sprockets, and power elevating mechanism for elevating one end of the belt, said mechanism comprising a rack, a gear adjacent to said drive sprocket engaging the rack, means for engaging and disengaging the rack with the gear and a stop adjustably secured to the rack to cause disengagement from the gear at a predetermined point.

13. In tractor mechanism, the combination of a frame, a tractor belt at each side thereof, tractor driving means, and means actuated by said driving means for raising one end of either of the belts independently of the other, and means for positively holding down either of the belts independent of the position of the other.

14. In a tractor, a frame, a driving axle, a tractor belt at each side of the frame and connected with the axle, driving mechanism, elevating means actuated by the driving mechanism for raising one end of either of the belts, locking means for securing the belts in adjusted position, and controlling means for simultaneously bringing said elevating means into action and releasing said locking means, said controlling means comprising means for automatically causing said locking means to reëngage at a certain point in the elevation of the belts.

15. In a tractor, the combination of a frame, a drive axle, driving mechanism therefor, a tractor belt at each side of the frame connected with the axle, elevating means actuated by the driving mechanism for elevating one end of either of said belts, controlling means for connecting said elevating means with the belts for elevating them, locking means for securing the belts in elevated position, and throw-off means independent of said controlling means for releasing the locking means.

16. In a tractor, the combination of a frame, a tractor belt, driving mechanism connected to the belt, elevating means actuated by said driving mechanism for raising one end of the belt, controlling means for connecting said elevating means with the belt to raise the same, controlling means to bring the elevating means into operative position to elevate the belt, and an adjustable throw-off device to automatically disconnect said elevating means when the belt is elevated to a predetermined point.

17. A tractor unit for tractors comprising a drive pulley, an axle therefor, an idler pulley, a belt passing around the pulley, radius pieces, one on each side of the pulleys, connecting the axle with the idler pulley, adjustment means by which the position of the idler in relation to the radius piece may be changed to vary the tension of the belt, endless roller channels in the radius pieces, and rollers circulating in the channels and in engagement with the lower stretch of the belt to hold the same in engagement with the ground between the pulleys.

18. A tractor unit for tractors comprising a drive pulley, an axle therefor, an idler pulley, a belt passing around the pulley, radius pieces one on each side of the pulleys connecting the axle with the idler pulley, and rollers carried by each of the radius pieces and engaging the belt near the edges thereof to maintain the belt in contact with the ground between the treads of the pulleys.

19. A tractor unit for tractors comprising a drive pulley, an axle therefor, an idler pulley, a belt passing around the pulley, radius pieces one on each side of the pulleys connecting the axle with the idler pulley, each of the radius pieces being provided with a roller channel, a series of rollers circulating in each of the channels, the channels being open at the bottom to permit the rollers to engage the belt near the edges thereof, the roller channels being constructed and arranged so that the rollers engage the belt and hold it firmly in contact with the ground substantially the entire distance from the tread of one of the pulleys to that of the other.

20. In tractor mechanism, the combination of a frame, two tractor belts, one at each side of the frame and pivoted thereto near one end of said belt, means for raising one end of either belt independently of the other, and means for positively holding down either of the belts independent of the position of the other.

WILLIAM STRAIT.

Witnesses:
D. M. SMITH,
A. M. PARKINS.